(12) United States Patent
Nakao

(10) Patent No.: US 9,810,763 B2
(45) Date of Patent: Nov. 7, 2017

(54) TERMINAL DEVICE, SCANNING METHOD AND INFORMATION PROCESSING SYSTEM

(71) Applicant: FUJITSU LIMITED, Kawasaki-shi, Kanagawa (JP)

(72) Inventor: Manabu Nakao, Kunitachi (JP)

(73) Assignee: FUJITSU LIMITED, Kawasaki (JP)

( * ) Notice: Subject to any disclaimer, the term of this patent is extended or adjusted under 35 U.S.C. 154(b) by 553 days.

(21) Appl. No.: 14/478,485

(22) Filed: Sep. 5, 2014

(65) Prior Publication Data
US 2015/0148065 A1    May 28, 2015

(30) Foreign Application Priority Data
Nov. 22, 2013  (JP) .................................. 2013-241633

(51) Int. Cl.
| | |
|---|---|
| *G01S 5/02* | (2010.01) |
| *H04W 48/14* | (2009.01) |
| *H04W 48/16* | (2009.01) |
| *H04W 64/00* | (2009.01) |
| *H04W 48/04* | (2009.01) |

(52) U.S. Cl.
CPC .......... *G01S 5/0289* (2013.01); *G01S 5/0284* (2013.01); *H04W 48/16* (2013.01); *H04W 48/04* (2013.01); *H04W 64/00* (2013.01)

(58) Field of Classification Search
CPC ..... H04W 48/04; H04W 48/16; G01S 5/0289; G01S 5/0284
USPC ...................................................... 455/456.1
See application file for complete search history.

(56) References Cited

U.S. PATENT DOCUMENTS

| | | | | |
|---|---|---|---|---|
| 2004/0253952 | A1* | 12/2004 | Rager | H04W 48/16 455/432.1 |
| 2007/0091847 | A1* | 4/2007 | Lee | H04W 28/18 370/331 |
| 2009/0164813 | A1* | 6/2009 | Tu | H04B 1/1615 713/320 |
| 2010/0008246 | A1* | 1/2010 | Watanabe | H04L 1/20 370/252 |

(Continued)

FOREIGN PATENT DOCUMENTS

| | | |
|---|---|---|
| CN | 102740294 A | 10/2012 |
| JP | 10-65599 | 3/1998 |

(Continued)

OTHER PUBLICATIONS

Japanese Office Action dated Jun. 6, 2017 in Japanese Patent Application No. 2013-241633 (with unedited computer generated English translation).

(Continued)

*Primary Examiner* — Qun Shen
(74) *Attorney, Agent, or Firm* — Oblon, McClelland, Maier & Neustadt, L.L.P.

(57) ABSTRACT

A terminal device includes a memory, and a processor coupled to the memory and configured to execute scanning for a wireless signals at a first frequency for a first time period after the terminal device changes from a stationary state to a movement state or for a second time period after the terminal device changes from the movement state to the stationary state, and stop the scanning or execute the scanning at a second frequency lower than the first frequency after the first time period has elapsed or after the second time period has elapsed.

17 Claims, 25 Drawing Sheets

(56) References Cited

U.S. PATENT DOCUMENTS

| | | | | |
|---|---|---|---|---|
| 2010/0136968 A1* | 6/2010 | Srivastava | ............ | H04W 48/16 |
| | | | | 455/434 |
| 2010/0208707 A1* | 8/2010 | Hamabe | ................ | H04W 24/10 |
| | | | | 370/332 |
| 2011/0124334 A1* | 5/2011 | Brisebois | .............. | H04W 48/16 |
| | | | | 455/434 |
| 2012/0094679 A1* | 4/2012 | Rao | ....................... | H04W 48/16 |
| | | | | 455/450 |
| 2012/0252516 A1* | 10/2012 | Miyabayashi | .......... | H04W 4/02 |
| | | | | 455/515 |
| 2013/0090117 A1* | 4/2013 | Ngai | ................. | H04W 52/0241 |
| | | | | 455/434 |
| 2014/0200009 A1* | 7/2014 | Schier | .................... | H04W 64/00 |
| | | | | 455/446 |
| 2015/0134649 A1* | 5/2015 | Yin | ................... | G06F 17/30964 |
| | | | | 707/723 |

FOREIGN PATENT DOCUMENTS

| | | |
|---|---|---|
| JP | 11-313041 | 11/1999 |
| JP | 2003-134029 | 5/2003 |
| JP | 2007-194801 A | 6/2007 |
| JP | 2007-311919 | 11/2007 |
| JP | 2011-217128 | 10/2011 |
| JP | 2013-54518 A | 3/2013 |
| JP | 2013-115443 A | 6/2013 |
| JP | 5247923 B1 | 7/2013 |

OTHER PUBLICATIONS

Office Action of Chinese Patent Application No. 201410566842.3 dated Aug. 14, 2017 with English translation, 25 pages.

\* cited by examiner

FIG. 4

| ADDRESS | RADIO WAVE INTENSITY [dB] |
|---|---|
| 12:34:56:78:90:AB | −50 |
| 12:34:56:78:90:AC | −60 |
| − | − |

| APPARATUS ID | ADDRESS |
|---|---|
| aaaa | 12:34:56:78:90:AB |
| bbbb | 12:34:56:78:90:AC |
| cccc | 12:34:56:78:90:AD |

FIG. 12

| GROUP ID | APPARATUS ID LIST | DETECTION PAIR LIST |
|---|---|---|
| 1 | 4,5,6 | (4,5) (5,6) |
| 2 | 1,2 | (1,2) |
| 3 | 7,8 | (7,8) |

T ↘

| GROUP ID | APPARATUS ID LIST | DETECTION PAIR LIST |
|---|---|---|
| 1 | 1,2 | (1,2) |
| 2 | 5,6 | (5,6) |
| 3 | 7,8 | (7,8) |

T ↘

| GROUP ID | APPARATUS ID LIST | DETECTION PAIR LIST |
|---|---|---|
| 1 | 1,2 | (1,2) |
| 2 | 5,6 | (5,6) |
| 3 | 7,8 | (7,8) |
| 4 | 3,4 | (3,4) |

GROUP 1

T ↙

| GROUP ID | APPARATUS ID LIST | DETECTION PAIR LIST |
|---|---|---|
| 1 | 1,2 | (1,2) |

T ↙

| GROUP ID | APPARATUS ID LIST | DETECTION PAIR LIST |
|---|---|---|
| 1 | 1,2,3 | (1,2) (1,3) |

FIG. 17A
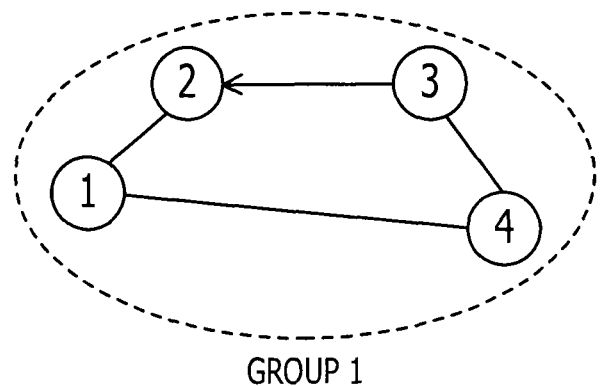
GROUP 1
FIG. 17B
| GROUP ID | APPARATUS ID LIST | DETECTION PAIR LIST |
|---|---|---|
| 1 | 1,2,3,4 | (1,2) (1,4) (3,4) |
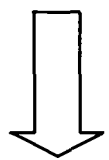
FIG. 17C
| GROUP ID | APPARATUS ID LIST | DETECTION PAIR LIST |
|---|---|---|
| 1 | 1,2,3,4 | (1,2) (1,4) (3,4) (2,3) |

FIG. 18A
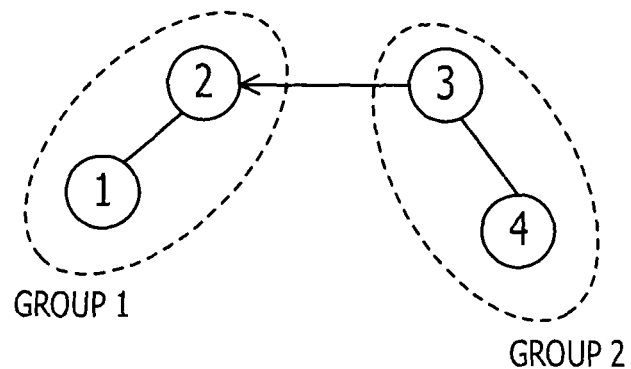
GROUP 1    GROUP 2
FIG. 18B
T
| GROUP ID | APPARATUS ID LIST | DETECTION PAIR LIST |
|---|---|---|
| 1 | 1,2 | (1,2) |
| 2 | 3,4 | (3,4) |
FIG. 18C
T
| GROUP ID | APPARATUS ID LIST | DETECTION PAIR LIST |
|---|---|---|
| 1 | 1,2,3,4 | (1,2) (3,4) (2,3) |

GROUP 1

| GROUP ID | APPARATUS ID LIST | DETECTION PAIR LIST |
|----------|-------------------|---------------------|
| 1 | 1,2 | (1,2) |

| GROUP ID | APPARATUS ID LIST | DETECTION PAIR LIST |
|----------|-------------------|---------------------|
| - | - | - |

FIG. 21A
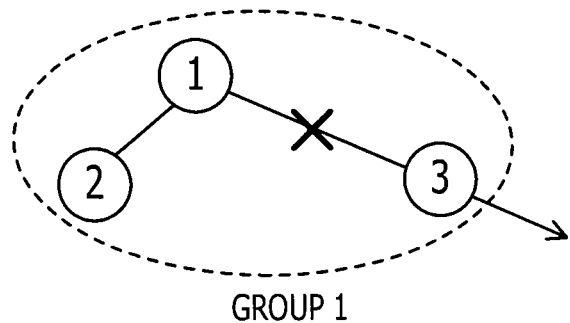
GROUP 1
FIG. 21B
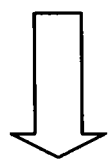
| GROUP ID | APPARATUS ID LIST | DETECTION PAIR LIST |
|---|---|---|
| 1 | 1,2,3 | (1,2) (1,3) |
FIG. 21C
T
| GROUP ID | APPARATUS ID LIST | DETECTION PAIR LIST |
|---|---|---|
| 1 | 1,2 | (1,2) |

FIG. 22A
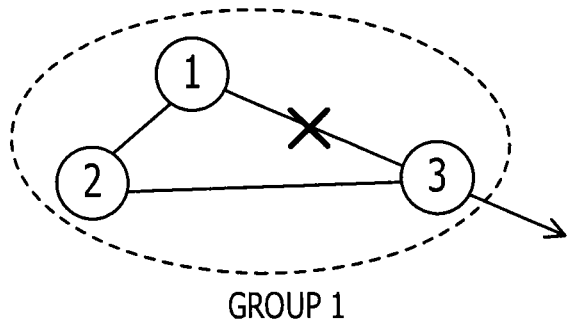
GROUP 1
FIG. 22B
T
| GROUP ID | APPARATUS ID LIST | DETECTION PAIR LIST |
|---|---|---|
| 1 | 1,2,3 | (1,2) (1,3) (2,3) |
FIG. 22C
T
| GROUP ID | APPARATUS ID LIST | DETECTION PAIR LIST |
|---|---|---|
| 1 | 1,2,3 | (1,2) (2,3) |

GROUP 1

T

| GROUP ID | APPARATUS ID LIST | DETECTION PAIR LIST |
|----------|-------------------|---------------------|
| 1 | 1,2,3,4 | (1,2) (1,3) (3,4) |

T

| GROUP ID | APPARATUS ID LIST | DETECTION PAIR LIST |
|----------|-------------------|---------------------|
| 1 | 1,2 | (1,2) |
| 2 | 3,4 | (3,4) |

TERMINAL DEVICE, SCANNING METHOD AND INFORMATION PROCESSING SYSTEM

CROSS-REFERENCE TO RELATED APPLICATION

This application is based upon and claims the benefit of priority from the prior Japanese Patent Application No. 2013-241633 filed on Nov. 22, 2013, the entire contents of which are incorporated herein by reference.

FIELD

The embodiments discussed herein relate to a terminal device, a scanning method, and an information processing system.

BACKGROUND

The provision of accurate information and communication technology (ICT) services in accordance with personal circumstances has become possible throughout all situations of human activity due to the development of technologies such as small servers, wireless communication, and mobile apparatuses. Surrounding "persons" and surrounding "things" may be used as items for indicating personal circumstances. For example, the user of a terminal is able to easily access desired information when such information is limited to photographs or documents to be provided to the terminal in accordance with the "person" near the terminal.

The following items have been proposed as technologies that used in detecting nearby "persons" or "things."

For example, a technology has been proposed in which position information of a plurality of terminals is transmitted to a server so that the server determines if any of the terminals are in locations approaching each other, and when the server determines that the terminals are approaching each other, the results of the determination are notified to each of the terminals.

Further, a technology has been proposed for detecting a terminal present in the vicinity of a nearby terminal based on receiving a short-distance wireless signal, such as a Bluetooth (trademark) or WiFi (trademark) wireless signal, that is transmitted from a device mounted on the nearby terminal. Japanese Laid-Open Patent Publication No. 2007-311919 and Japanese Laid-Open Patent Publication No. 2011-217128 are examples of prior art documents.

SUMMARY

According to an aspect of the invention, a terminal device includes a memory, and a processor coupled to the memory configured to execute scanning for a wireless signals at a first frequency for at least one of a first time period and a second time period, the first time period is a time period after the terminal device changes from a stationary state to a movement state, when the scanning at the first frequency is executed for the first time period, perform at least one of stopping the scanning and executing the scanning at a second frequency lower than the first frequency after the first time period has elapsed, and when the scanning at the first frequency is executed for the second time period, perform at least one of stopping the scanning and executing the scanning at the second frequency after the second time period has elapsed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a schematic view of a scanning apparatus information list according to the first embodiment;

FIG. 5 is a schematic view of a detection object list according to the first embodiment;

FIG. 12 is a schematic view of a group state management table according to the first embodiment;

FIGS. 17A, 17B, and 17C are schematic views of a detailed example 3 of entry processing according to the first embodiment.

FIGS. 18A, 18B, and 18C are schematic views of a detailed example 4 of entry processing according to the first embodiment.

FIGS. 21A, 21B, and 21C are schematic views of a detailed example 6 of exit processing according to the first embodiment.

FIGS. 22A, 22B, and 22C are schematic views of a detailed example 7 of exit processing according to the first embodiment.

DESCRIPTION OF EMBODIMENTS

First Embodiment

The incessant detection of "persons" and "things" is desirable in order to provide an accurate ICT service for human circumstances.

However, because power consumption for positioning is very high regardless of the positioning method, a battery does not last very long when positioning is executed by a terminal. The battery in a terminal will not last for very long when detecting "persons" and "things" even with the use of wireless signals such as Bluetooth and Wi-Fi.

The embodiments discussed herein pertain to a terminal, a terminal control method, a terminal control program, and a server that enable a suppression of power consumption by the terminal and enable the suppression of omissions of detections of nearby persons and things. A first embodiment will be described hereinbelow with reference to FIGS. 1 to 23.

Outline of Detection System

Figure 1:
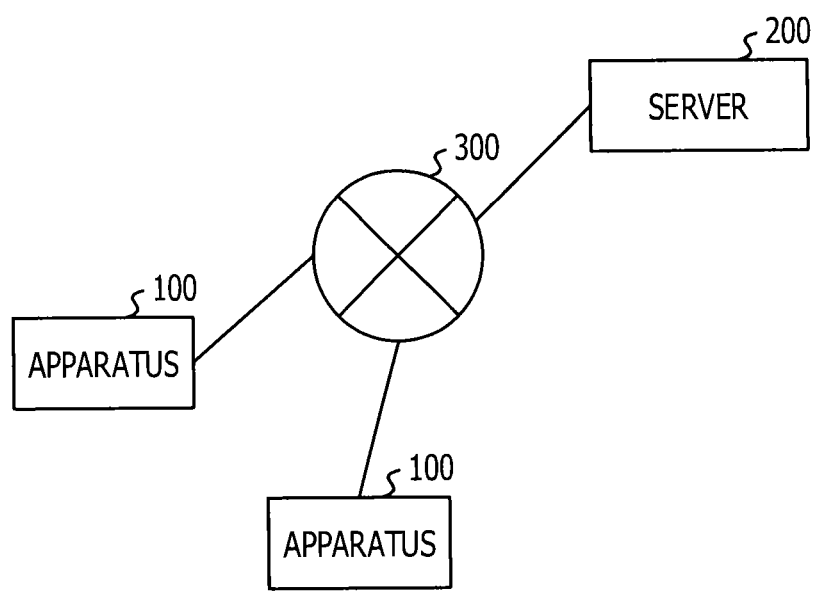
FIG. 1 is a schematic view of a detection system according to a first embodiment.

FIG. 1 is a schematic view of a detection system according to a first embodiment.

As illustrated in FIG. 1, the detection system according to the present embodiment is provided with a plurality of apparatuses (terminals) 100, and a server 200. The plurality of apparatuses 100 and the server 200 are coupled together via a wired or wireless network 300. Smartphones, tablet PCs, or notebook PCs may be used as the apparatuses 100.

Hardware Configuration of Apparatus 100

Figure 2:
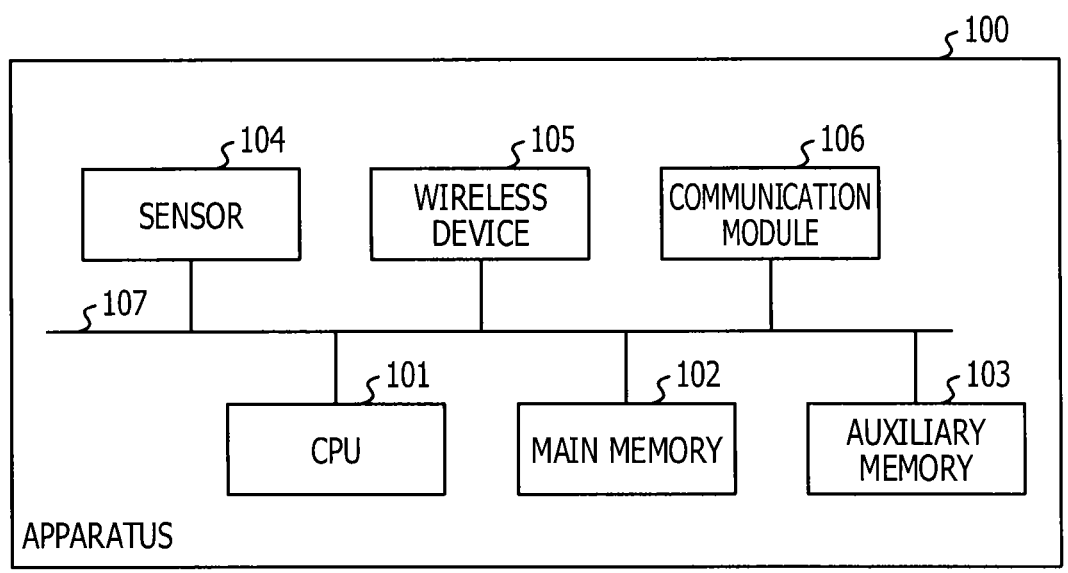
FIG. 2 is a schematic view of a hardware configuration of an apparatus according to the first embodiment.

FIG. 2 is a schematic view of a hardware configuration of the apparatus 100 according to the first embodiment.

As illustrated in FIG. 2, the apparatus 100 according to the present embodiment is provided with a central processing unit (CPU) 101, a main memory 102, an auxiliary memory 103, a sensor 104, a wireless device 105, and a communication module 106 as hardware modules. The hardware modules are coupled together, for example, through a bus 107.

The CPU 101 realizes various functions by reading various programs stored in the auxiliary memory 103 into the main memory 102 via the bus 107 and executing the various programs read in the main memory 102. Details of the various functions are described below.

The main memory 102 stores various programs executed by the CPU 101. The main memory 102 is used as a work area by the CPU 101 and stores various types of data useful for processing by the CPU 101. A random access memory (RAM) for example may be used as the main memory 102.

The auxiliary memory 103 stores various programs for operating the apparatus 100. In addition to application programs executed by the apparatus 100, for example, the various programs include an operating system (OS) which is an environment for operating the application programs. A control program according to the present embodiment is stored in the auxiliary memory 103. A non-volatile memory such as a hard disk, a flash memory, or a read-only memory (CD-ROM) may be used as the auxiliary memory 103.

The sensor 104 detects various states of the apparatus 100. An acceleration sensor, a gyroscopic sensor, an air pressure sensor, a brightness sensor, a camera, or a microphone and the like may be used as the sensor 104.

The wireless device 105 issues beacon signals (short-distance wireless signals) at a predetermined frequency. Moreover, the wireless device 105 switches to a beacon signal receiving state based on the output of the sensor 104 for example, and receives beacon signals transmitted by wireless devices mounted on nearby apparatuses.

Hereinbelow, the action of the wireless device 105 switching to a beacon signal receiving state and receiving beacon signals transmitted by nearby apparatuses is referred to as "scanning." The time period from the start to the end of the first scanning in order to accurately receive transmitted beacon signals for each predetermined time period is set to be at least longer than a transmission interval of a beacon signal. As a result, the power consumption for scanning is much greater than the power consumption during, for example, a waiting state of a mobile terminal (e.g., 5 mA to 6 mA). A wireless signal determined by a standard such as Bluetooth Low Energy (BLE) or Wi-Fi may be used for short-distance wireless communication.

The communication module 106 uses a communication protocol such as 3-Generation (3G) or long term evolution (LTE) when performing communication between the apparatus 100 and the server 200.

Functional Block of Apparatus 100

Figure 3:
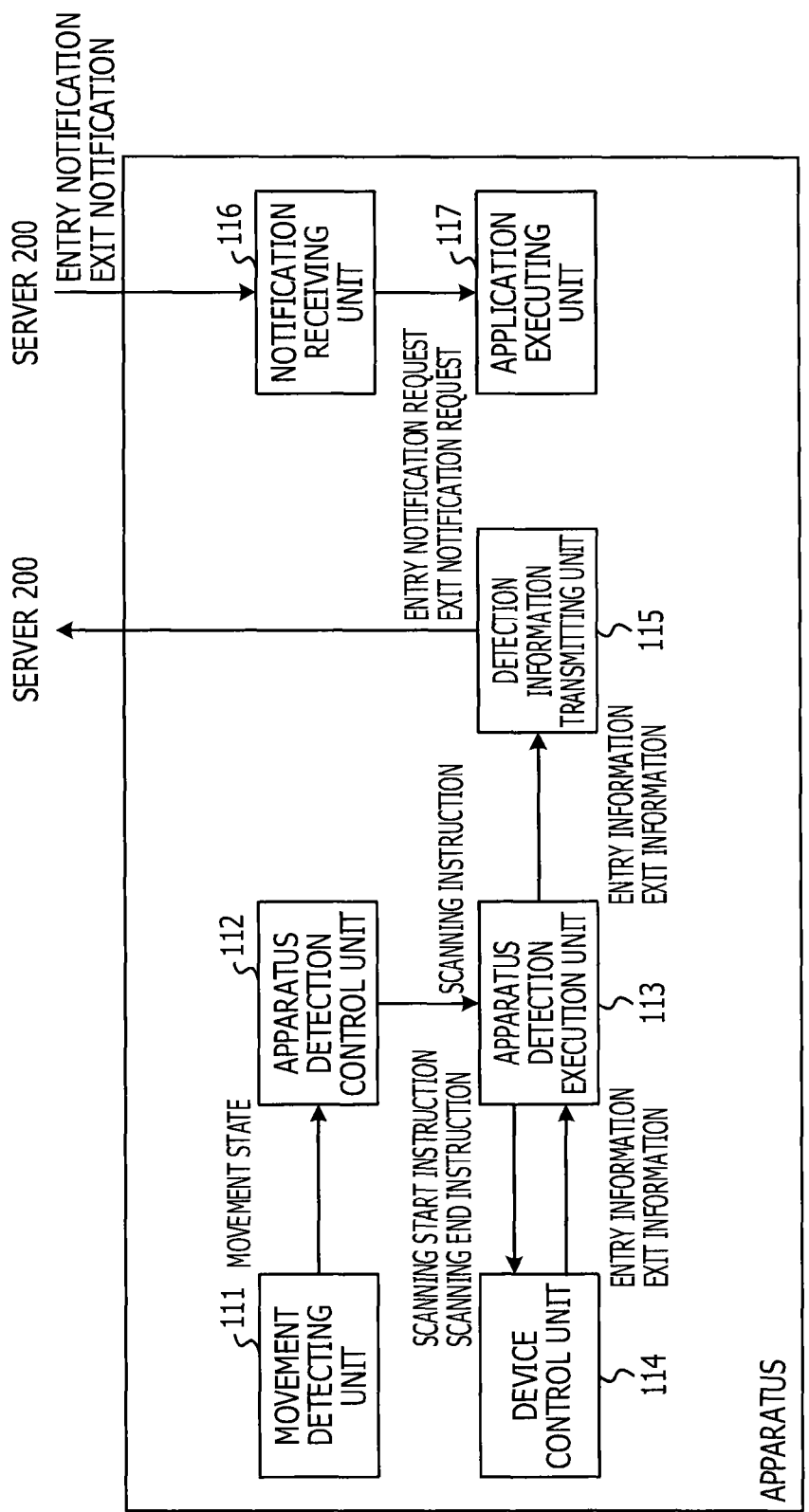
FIG. 3 is a schematic view of functional blocks of the apparatus according to the first embodiment.

FIG. 3 is a schematic view of a functional block of the apparatus 100 according to the first embodiment.

As illustrated in FIG. 3, the apparatus 100 is provided with a movement detecting unit 111, an apparatus detection control unit (scanning control unit) 112, an apparatus detection execution unit 113, a device control unit 114, a detection information transmitting unit 115, a notification receiving unit 116, and an application executing unit 117. Moreover, the main memory 102 or the auxiliary memory 103 stores a scanning apparatus information list L1, a detection object list L2, and a detected apparatus list L3 and the like.

The movement detecting unit 111, the apparatus detection control unit 112, the apparatus detection execution unit 113, the device control unit 114, the detection information transmitting unit 115, the notification receiving unit 116, and the application executing unit 117 are all realized by the CPU 101 reading control programs into the main memory 102 and executing the read control programs in the main memory 102.

The movement detecting unit 111 detects a movement state of the apparatus 100 based on an output of the sensor 104. The movement state of the apparatus 100 corresponds to a movement state of the user of the apparatus 100. Moreover, the movement detecting unit 111 notifies the apparatus detection control unit 112 about the movement state of the apparatus 100. For example, when the apparatus 100 is being moved, the movement detecting unit 111 notifies the apparatus detection control unit 112 about the "movement". Furthermore, when the apparatus 100 is at rest, the movement detecting unit 111 notifies the apparatus detection control unit 112 that the apparatus 100 is "stationary".

A measurement algorithm for the number of steps used in a pedometer, for example, may be used to detect the movement state. When using a measurement algorithm for the number of steps, the movement detecting unit 111 detects a positive load peak of a tri-axis composite value of tri-axis acceleration signals from a tri-axis acceleration sensor mounted in the apparatus 100 and then counts the number of steps when an opposite polarity peak is detected in a predetermined time period. That is, the movement detecting unit 111 determines that the apparatus 100 is stationary when the number of steps does not change during a predetermined time period and that the apparatus 100 is moving when the number of steps changes during the predetermined time period.

Upon a change of the movement state notified by the movement detecting unit 111, the apparatus detection control unit 112 issues, to the apparatus detection execution unit 113 a scanning instruction for causing the wireless device 105 to execute scanning, or specifically a scanning start instruction and a scanning stop instruction, for a predetermined time period after the change in the movement state.

The apparatus detection execution unit 113 issues a scanning start instruction and a scanning stop instruction to the device control unit 114 based on the scanning instructions from the apparatus detection control unit 112. The apparatus detection execution unit 113 also determines that an apparatus with a beacon signal radio wave strength equal to or greater than a threshold value is an apparatus present within a nearby area of the apparatus 100 based on the scanning apparatus information list L1, and registers the apparatus in the detected apparatus list L3. Moreover, the apparatus detection execution unit 113 detects an "entry of apparatus" or an "exit of apparatus" based on the detected apparatus list L3.

"Entry of apparatus" refers to the entry of another apparatus into the nearby area of the apparatus 100. "Exit of apparatus" refers to the exit of another apparatus from the nearby area of the apparatus 100. Because the identification information (apparatus ID) of an apparatus present in the nearby area of the apparatus 100 is registered in the detected apparatus list L3, the entry of another apparatus into the nearby area of the apparatus 100 and the exit of another apparatus from the nearby area of the apparatus 100 can be detected by searching for the apparatus ID added to the detected apparatus list L3 or the apparatus ID removed from the detected apparatus list L3. While "entry into the apparatus" and "exit from the apparatus" and the like are written hereinbelow, the phrases respectively signify "entry into the nearby area of the apparatus" and "exit from the nearby area of the apparatus."

The apparatus detection execution unit 113 sends entry information to the detection information transmitting unit 115 when an "entry of apparatus" is detected. The entry information includes the apparatus ID of the apparatus (apparatus 100) that detected the "entry of apparatus", and the apparatus ID of the apparatus (hereinbelow referred to as detected apparatus) that was detected as entering into the apparatus 100. The apparatus detection execution unit 113 reports exit information to the detection information transmitting unit 115 when an "exit of apparatus" is detected. The exit information includes the apparatus ID of the apparatus (apparatus 100) that detected the "exit of apparatus", and the apparatus ID of the apparatus (hereinbelow referred to as detected apparatus) that was detected as exiting from the apparatus 100.

The device control unit 114 controls the communication module 106 to execute the transmission and reception of the beacon signals. Moreover, the device control unit 114 records, in the scanning apparatus information list L1, the address of the apparatus that is the transmission source of the beacon signal and the radio wave strength of the beacon signals according to the beacon signal received by the communication module 106. The scanning apparatus information list L1 is described in detail below.

The detection information transmitting unit 115 transmits an entry notification request and an exit notification request to the server 200 based on the entry information and the exit information from the apparatus detection execution unit 113. The entry notification request includes the apparatus ID of the apparatus (apparatus 100) that detected the "entry of apparatus", and the apparatus ID of the apparatus (detected apparatus) that was detected as entering into the apparatus 100. The exit notification request includes the apparatus ID of the apparatus (apparatus 100) that detected the exit of the apparatus, and the apparatus ID of the apparatus (detected apparatus) that was detected as exiting from the apparatus 100. Upon receiving the entry notification request, the server 200 notifies the detected apparatus about the entry into the apparatus that is the transmission source of the entry notification request, that is, the entry into the apparatus 100 that detected the "entry of apparatus". Upon receiving the exit notification request, the server 200 notifies the detected apparatus about the exit from the apparatus that is the transmission source of the exit notification request, that is, the exit from the apparatus 100 that detected the "exit of apparatus".

The notification receiving unit 116 receives an entry notification and an exit notification from the server 200. The entry notification includes the apparatus ID of the other apparatus that entered the apparatus 100, that is, that was detected as entering by the apparatus 100. The exit notification includes the apparatus ID of the other apparatus that exited the apparatus 100, that is, that was detected as exiting by the apparatus 100.

The application executing unit 117 controls the execution of applications based on the entry notifications and exit notifications from the notification receiving unit 116. For example, when the notification receiving unit 116 receives an entry notification, the application executing unit 117 executes an application related to the apparatus (apparatus that is the transmission source of the entry notification request) read from the entry notification or related to the user thereof. While not limited in particular, the types of the applications are ones, for example, which include contents such as photographs or documents. An icon of the application may be displayed in a noticeable location on the home screen of the apparatus 100 instead of the execution of the application. Further, when an exit notification is received from the notification receiving unit 116, the application executing unit 117 may stop the execution of the application related to the apparatus (apparatus that is the transmission source of the exit notification request) read from the exit notification or related to the user thereof. Moreover, an icon of the application may be removed from a noticeable location on the home screen of the apparatus 100 instead of stopping the execution of the application.

Scanning Apparatus Information List L1

FIG. 4 is a schematic view of the scanning apparatus information list L1 according to the first embodiment.

As illustrated in FIG. 4, the scanning apparatus information list L1 according to the present embodiment records the address of an apparatus that is the transmission source of a beacon signal detected by the apparatus 100 and the radio wave intensity of the beacon signal. For example, the address "12:34:56:78:90:AB" and the radio wave intensity "−50" are recorded in the first row and the address "12:34:56:78:90:AC" and the radio wave intensity "−60" are recorded in the second row of the scanning apparatus information list L1 according to the present embodiment.

Detection Object List L2

FIG. 5 is a schematic view of a detection object list L2 according to the first embodiment.

As illustrated in FIG. 5, the detection object list L2 according to the present embodiment stores the identification information (apparatus ID) of an apparatus for detection and the address of the apparatus for detection. For example, the apparatus ID and the address of an address that the user of the apparatus 100 wants to detect may be registered in the detection object list L2.

Detected Apparatus List L3

Figure 6:
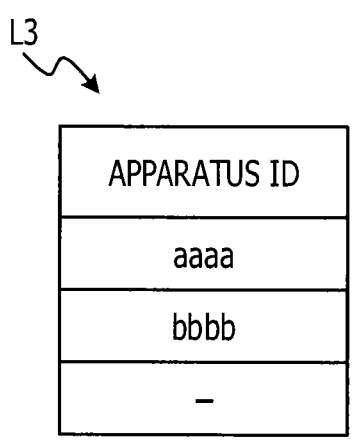
FIG. 6 is a schematic view of a detected apparatus list according to the first embodiment.

FIG. 6 is a schematic view of the detected apparatus list 3 according to the first embodiment.

As illustrated in FIG. 6, the detected apparatus list L3 according to the present embodiment records the apparatus ID of an apparatus present in the nearby area of the apparatus 100. An apparatus "aaaa" and an apparatus "bbbb" are present in the nearby area of the apparatus 100 in the detected apparatus list L3 according to the present embodiment. As a result, an entry of an apparatus into the nearby area of the apparatus 100 and an exit of an apparatus from the nearby area of the apparatus 100 can be detected by monitoring the detected apparatus list L3.

Scanning Control Processing

The apparatus detection control unit 112 of the apparatus 100 according to the present embodiment executes scanning control processing as described below.

Figure 7:
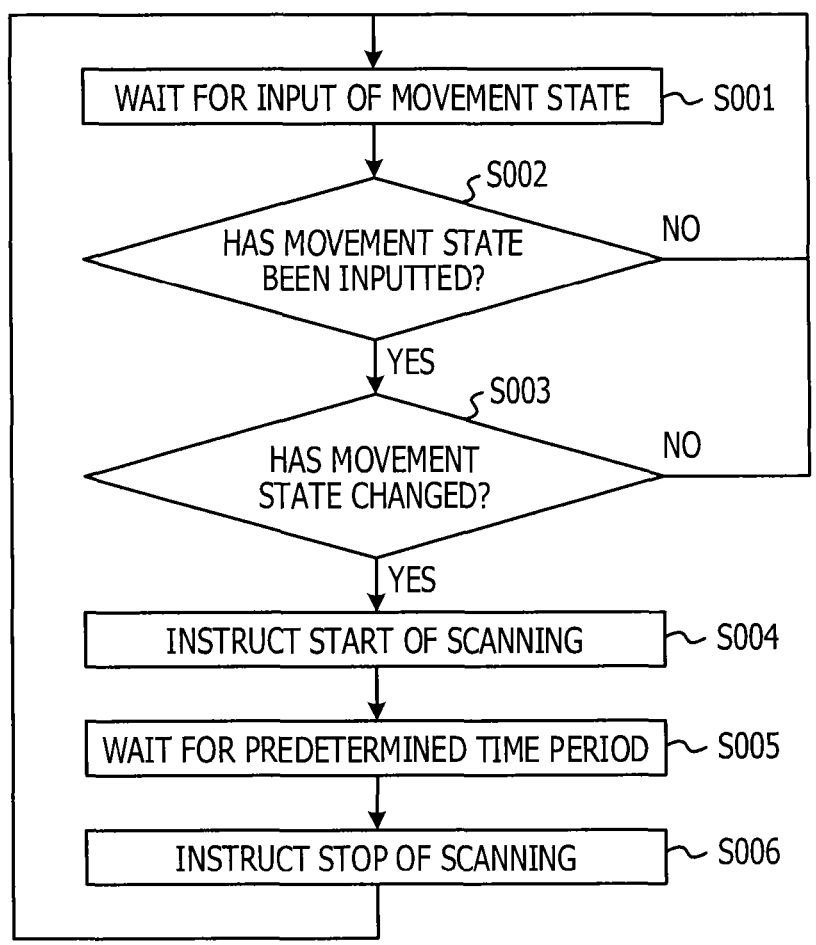
FIG. 7 is a flow chart of scanning control processing according to the first embodiment.

FIG. 7 is a flow chart of scanning control processing according to the first embodiment.

As illustrated in FIG. 7, the apparatus detection control unit 112 waits for an input of a movement state of the apparatus 100 (step S001).

Next, the apparatus detection control unit 112 determines if the movement state of the apparatus 100 has been inputted (step S002).

If it is determined that the movement state has not been inputted in step S002 (step S002: No), the apparatus detection control unit 112 continues to wait for an input of a movement state of the apparatus 100 (step S001).

Conversely, if it is determined that the movement state has been inputted in step S002 (step S002: Yes), the apparatus detection control unit 112 determines whether the movement state has changed, that is, determines whether the current movement state differs from the previous movement state (step S003).

If it is determined that the movement state has not changed in step S003 (step S003: No), the apparatus detection control unit 112 continues to wait for an input of a movement state of the apparatus 100 (step S001).

Conversely, if it is determined that the movement state has changed in S003 (step S003: Yes), the apparatus detection control unit 112 instructs the apparatus detection execution unit 113 to start scanning (step S004).

Next, the apparatus detection control unit 112 waits for a predetermined time period after the change of the movement state (step S005), and then instructs the apparatus detection execution unit 113 to stop scanning (step S006).

Next, the apparatus detection control unit 112 waits again for an input of a movement state of the apparatus 100 (step S001).

The apparatus detection control unit 112 according to the present embodiment is caused by the wireless device 105 to execute scanning for a predetermined time period after a change of the movement state as described above. As a result, the power consumption attributed to scanning can be greatly reduced compared to when scanning is continuously executed by the wireless device 105. A detailed explanation is provided below.

The apparatus detection control unit 112 according to the present embodiment stops the scanning when the predetermined time period from the change of the movement state has elapsed. However, the present disclosure is not limited to this example. For example, instead of stopping the scanning, the scanning may be continued at a lower scanning frequency than a normal scanning frequency (scanning frequency during the predetermined time period after the change of the movement state). Even with such a configuration, the power consumption can be reduced compared to when scanning is executed at a normal scanning frequency by the wireless device 105.

While the apparatus detection control unit 112 according to the present embodiment is caused to execute the scanning by the wireless device 105 for only the predetermined time period after the change of the movement state, it goes without saying that the execution of the scanning is caused once again by the wireless device 105 when another change of the movement state occurs after the scanning has been stopped.

Apparatus Detection Execution Processing

The apparatus detection execution unit 113 of the apparatus 100 according to the present embodiment performs apparatus detection execution processing as described below.

Figure 8:
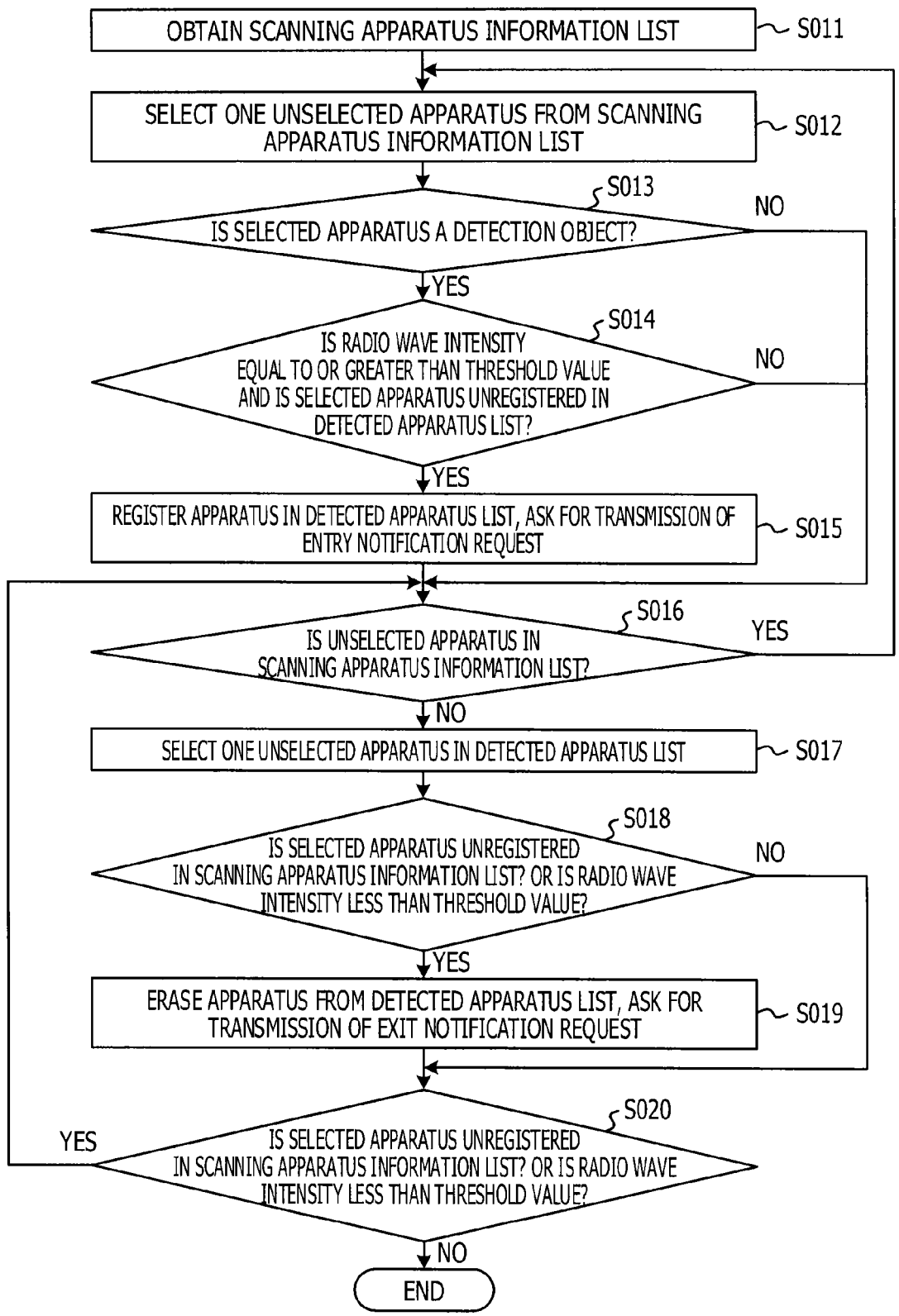
FIG. 8 is a flow chart of detection apparatus execution processing according to the first embodiment.

FIG. 8 is a flow chart of detection apparatus execution processing according to the first embodiment.

As illustrated in FIG. 8, the apparatus detection execution unit 113 obtains the scanning apparatus information list L1 from the device control unit 114 (step S011).

Next, the apparatus detection execution unit 113 selects one unselected apparatus from the apparatuses registered in the scanning apparatus information list L1 (step S012).

The apparatus detection execution unit 113 then determines whether the selected apparatus is a detection object (step S013). Specifically, the apparatus detection execution unit 113 determines whether the address of the selected apparatus is registered in the detection object list L2.

If it is determined that the selected apparatus is a detection object in step S013 (step S013: Yes), that is, if the address of the selected apparatus is already registered in the detection object list L2, the apparatus detection execution unit 113 determines whether the radio wave intensity of the selected apparatus is equal to or greater than a threshold value and whether the selected apparatus is unregistered in the detected apparatus list L3 based on the scanning apparatus information list L1 (step S014).

If it is determined that the radio wave intensity of the selected apparatus is equal to or greater than the threshold value and the selected apparatus is unregistered in the detected apparatus list L3 in step S014 (step S014: Yes), the apparatus detection execution unit 113 registers the selected apparatus in the detected apparatus list L3 and asks the detection information transmitting unit 115 to transmit an entry notification request with regard to the selected apparatus (step S015).

Next, the apparatus detection execution unit 113 determines whether an unselected apparatus is present in the scanning apparatus information list L1 (step S016). Similarly, if it is determined in step S013 that the selected apparatus is not a detection object (step S013: No), or if it is determined in step S014 that the radio wave intensity of the selected apparatus is less than the threshold value and that the selected apparatus is registered in the detected apparatus list L3 (step S014: No), the apparatus detection execution unit 113 determines whether an unselected apparatus is present in the scanning apparatus information list L1 (step S016).

If it is determined in step S016 that an unselected apparatus is present (step S016: Yes), the apparatus detection execution unit 113 once again selects one unselected apparatus from the apparatuses registered in the scanning apparatus information list L1 (step S012).

However, if it is determined in step S016 that no unselected apparatus is present (step S016: No), the apparatus detection execution unit 113 selects one apparatus from the unselected apparatuses registered in the detected apparatus list L3 (step S017).

Next, the apparatus detection execution unit 113 determines whether the selected apparatus is unregistered in the scanning apparatus information list L1 and determines whether the radio wave intensity of the selected apparatus is less than the threshold value (step S018).

If it is determined in step S018 that the selected apparatus is unregistered in the scanning apparatus information list L1 (step S018: Yes) and it is determined that the radio wave intensity of the selected apparatus is less than the threshold value (step S018: Yes), the apparatus detection execution unit 113 erases the selected apparatus from the detected apparatus list L3 and asks the detection information transmitting unit 115 to transmit an exit notification request with regard to the selected apparatus (step S019).

Next, it is determined whether an unselected apparatus is present in the detected apparatus list L3 (step S020). Similarly, if it determined in step S018 that the selected apparatus is registered in the scanning apparatus information list L1 and if it is determined that the radio wave intensity of the selected apparatus is not less than the threshold value (step S018: No), the apparatus detection execution unit 113 determines whether an unselected device is present in the detected apparatus list L3 (step S020).

If it is determined in step S020 that an unselected apparatus is present in the detected apparatus list L3 (step S020: Yes), the apparatus detection execution unit 113 once again determines whether an unselected apparatus is present in the scanning apparatus information list L1 (step S016).

Details of Scanning Control Processing

Figure 9:
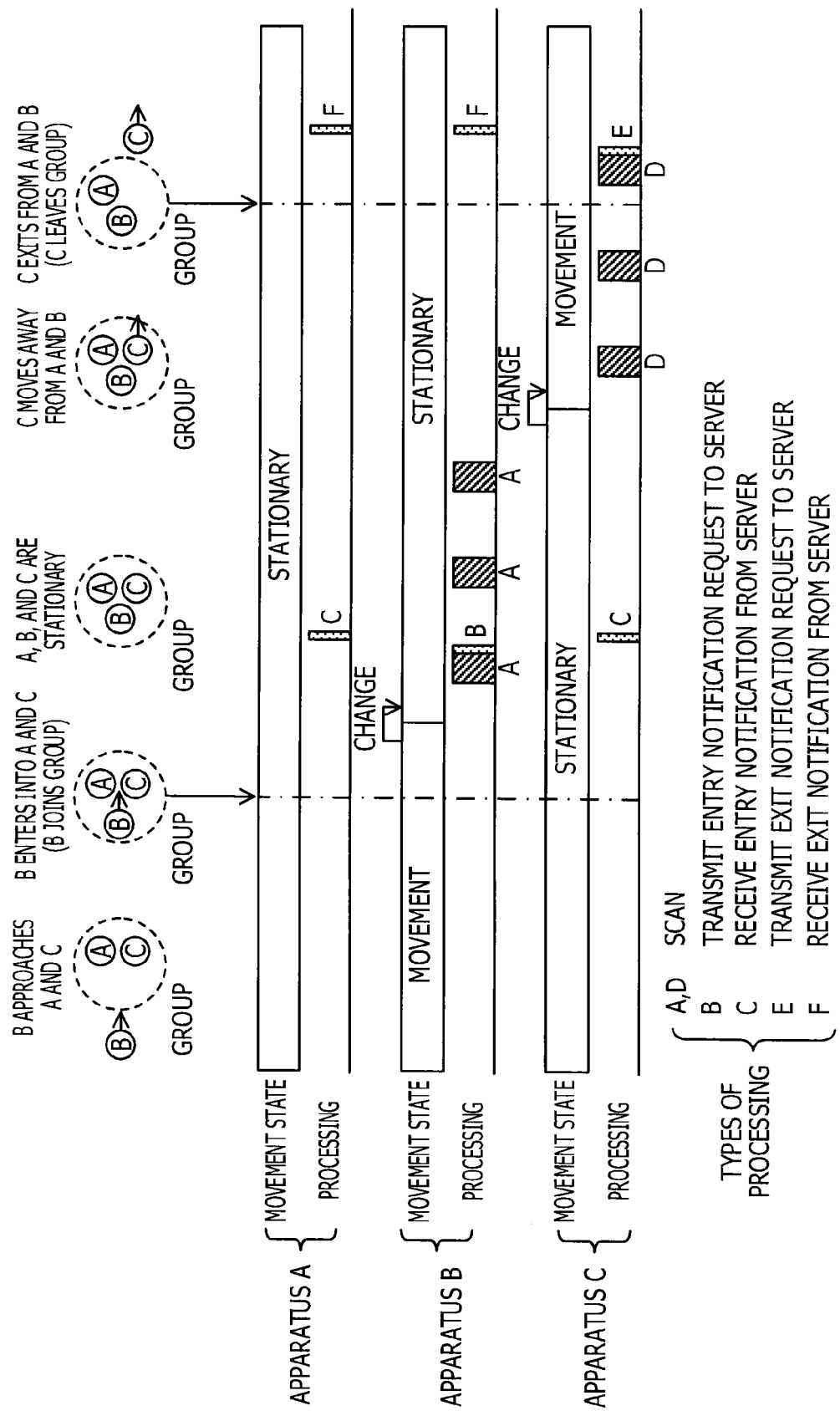
FIG. 9 is a schematic view of scanning control processing according to the first embodiment.

FIG. 9 is a schematic view scanning control processing according to a first embodiment and illustrates changes in the movement states of an apparatus A, an apparatus B, and an apparatus C and processing conditions of the apparatus A, the apparatus B, and the apparatus C.

The apparatus A, the apparatus B, and the apparatus C transmit beacon signals at a predetermined frequency. The beacon signal includes the address of the apparatus that is the transmission source of the beacon signal. Therefore, by reading the address in the beacon signal, the apparatus that is the transmission source of the beacon signal can be identified.

As illustrated in FIG. 9, the apparatus B approaches the apparatus A and the apparatus C and remains stationary after entering the nearby area of the apparatus A and the apparatus C. Since the movement state of the apparatus B changes from "moving" to "stationary", the scanning control processing according to the present embodiment is activated and executes scanning for a predetermined time period after the change in the movement state (processing A in FIG. 9). As a result, apparatus B detects the entry of the apparatus A and the apparatus C. While the scanning is executed three times for the predetermined time periods after the change in the movement state in the present embodiment, the present disclosure is not limited in this way.

Next, the apparatus B notifies the apparatus A and the apparatus C about the detection of the entry into the apparatus A and the apparatus C and thus transmits the entry detection request with regard to the apparatus A and the apparatus C to the server 200 (processing B in FIG. 9). As a result, the apparatus A and the apparatus C receive the entry notification transmitted by the server 200 (processing C in FIG. 9) to detect the entry of the apparatus B. In this way, the apparatus A, the apparatus B, and the apparatus C are each able to learn that the apparatus A, the apparatus B, and the apparatus C are located near each other.

Next, the apparatus C moves away from the apparatus A and the apparatus B and leaves the nearby area of the apparatus A and the apparatus B. At this time, since the movement state of the apparatus C changes from "stationary" to "moving", the scanning control processing according to the present embodiment is activated and executes scanning for a predetermined time period after the change in the movement state (processing D in FIG. 9). As a result, the exit of the apparatus C from the apparatus A and the apparatus B is detected. While the scanning is executed three times for the predetermined time periods after the change in the movement state in the present embodiment, the present disclosure is not limited in this way.

Next, the apparatus C transmits the exit notification request with regard to the apparatus A and the apparatus B to the server 200 in order to notify the apparatus A and the apparatus B about the detection of the exit from the apparatus A and the apparatus B (processing E in FIG. 9). As a result, the apparatus A and the apparatus B receive the exit notification transmitted by the server 200 (processing F in FIG. 9) and detect the exit of the apparatus C. In this way, the apparatus A, the apparatus B, and the apparatus C are each able to learn that the apparatus C has exited from the apparatus A and the apparatus B.

In this way, the scanning is executed only during the predetermined time period after a change in the movement state of an apparatus in the present embodiment. That is, scanning is executed only when there is a change in the movement state of an apparatus. As a result, the power consumption of the apparatuses can be reduced in comparison to the conventional art in which the scanning is executed constantly.

However, the entry or exit of an apparatus that does not have a change in the movement state is not detected with the above configuration. As a result, the entry notification or the exit notification is transmitted via the server 200 to the apparatus that enters or exits the apparatus that is the transmission source of the entry notification request or exit notification request. As a result, an apparatus that does not have a change in the movement state, that is, an apparatus that does not execute scanning, is able to know about the entry or exit of another apparatus.

Moreover, the transmission of the entry notification request or the exit notification request to the server 200 and the reception of the entry notification or exit notification transmitted by the server 200 makes use of 3G or LTE which exhibits less power consumption than short-distance wireless communication methods such as BLT or Wi-Fi, and therefore the power consumption of the apparatuses can be further suppressed.

Hardware Configuration of Server 200

Figure 10:
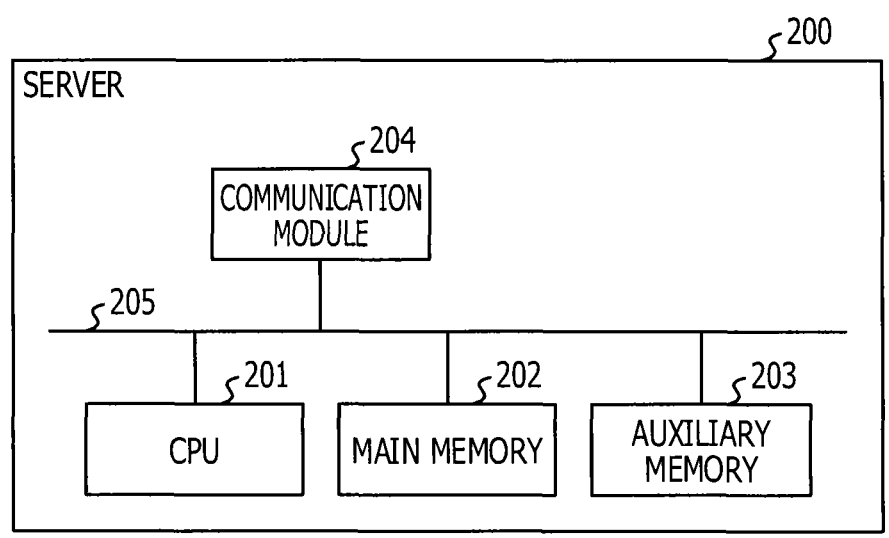
FIG. 10 is a schematic view of a hardware configuration of a server according to the first embodiment.

FIG. 10 is a schematic view of a hardware configuration of the server 200 according to the first embodiment.

As illustrated in FIG. 10, the server 200 according to the present embodiment is provided with a CPU 201, a main memory 202, an auxiliary memory 203, and a communication module 204 as hardware modules. The hardware modules are coupled to each other, for example, through a bus 205.

The CPU 201 reads various programs stored in the auxiliary memory 203 into the main memory 202 via the bus 205 and implements various functions by executing the various programs read in the main memory 202. Details of the various functions are described below.

The main memory 202 stores various programs executed by the CPU 201. The main memory 202 is used as a work area by the CPU 201 and stores various types of data used by the CPU 201 for processing. A random access memory (RAM) for example may be used as the main memory 202.

The auxiliary memory 203 stores various programs for operating the server 200. In addition to application programs executed by the server 200, for example, the various programs include an operating system (OS) which is an environment for executing the application programs. A control program according to the present embodiment is stored in the auxiliary memory 203. A non-volatile memory such as a hard disk, a flash memory, or a CD-ROM may be used as the auxiliary memory 203.

The communication module 204 uses a communication protocol such as 3G or LTE when performing communication between the apparatuses 100 and the server 200.

Functional Blocks of Server 200

Figure 11:
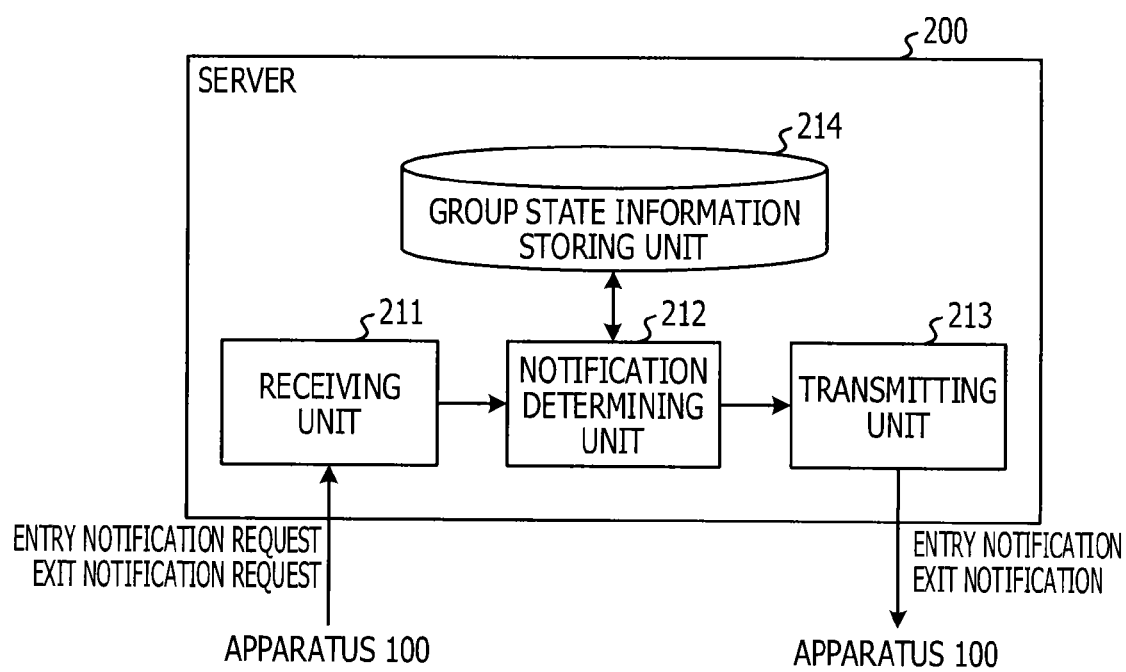
FIG. 11 is a schematic view of functional blocks of a server according to the first embodiment.

FIG. 11 is a schematic view of functional blocks of the server 200 according to the first embodiment.

As illustrated in FIG. 11, the server 200 according to the present embodiment is provided with a receiving unit 211, a notification determining unit 212, a transmitting unit 213, and a group state information storing unit 214.

The receiving unit 211, the notification determining unit 212, the transmitting unit 213, and the group state information storing unit 214 are all realized by the CPU 201 reading the control program from the main memory 202 and executing the control program read from the main memory 202.

The receiving unit 211 receives notification requests, that is entry notification requests and exit notification requests, from the apparatus 100.

The notification determining unit 212 executes entry processing or exit processing based on the notification request transmitted by the apparatus 100. Details of the entry processing and exit processing are provided below. The notification determining unit 212 manages the recording of a group state management table T stored in the group state information storing unit 214.

The group state information storing unit 214 stores the group state management table T. Details of the group state management table T are provided below.

Group State Management Table T

FIG. 12 is a schematic view of the group state management table T according to the first embodiment.

As illustrated in FIG. 12, the group state management table T according to the present embodiment records a group ID, an apparatus ID list, and a detection pair list. The group ID is identification information of a group. The apparatus ID list is identification information of apparatuses that belong to the groups. The detection pair list is a list of pairs that include an apparatus ID of an apparatus that has detected the entry into a certain apparatus and an apparatus ID of the apparatus that was detected as entering into the certain apparatus. A group refers to a group of a plurality of apparatuses linked by a chain of entry relationships. When a certain apparatus enters into two apparatuses, the two apparatuses become members of a common group since the two apparatuses are linked by the entry relationship through the certain apparatus. For example, the group ID "1", the apparatus ID list "4, 5, 6," and the detection pair list "(4,5), (5,6)" are recorded in the first row of the group state management table T according to the present embodiment.

Notification Determination Processing

The notification determining unit 212 in the server 200 according to the present embodiment executes the following notification determination processing.

Figure 13:
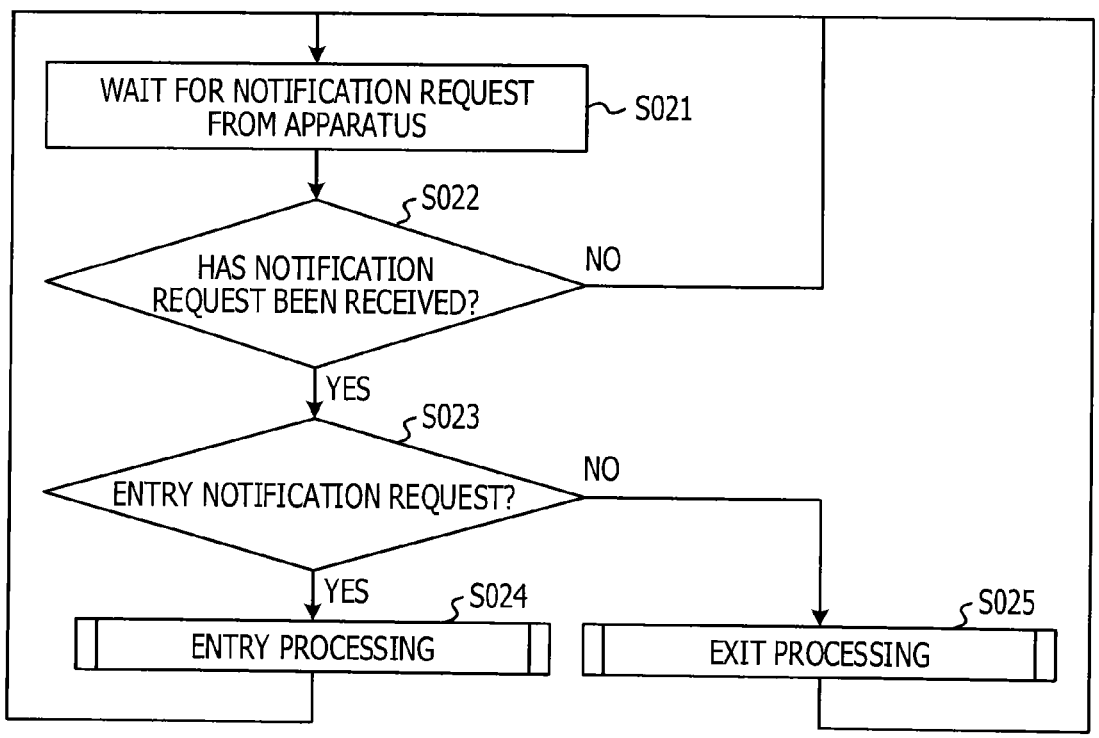
FIG. 13 is a flow chart of notification determination processing according to the first embodiment.

FIG. 13 is a flow chart of notification determination processing according to the first embodiment.

As illustrated in FIG. 13, the notification determining unit 212 according to the present embodiment waits for a notification request from the apparatus 100 (step S021).

Next, the notification determining unit 212 determines if a notification request has been received (step S022).

If it is determined that no notification request has been received in step S022 (step S022: No), the notification determining unit 212 waits for a notification request from the apparatus 100 (step S021).

If it is determined that a notification request has been received in step S022 (step S022: Yes), the notification determining unit 212 determines whether the notification request is an entry notification request (step S023).

If it is determined that the notification request is an entry notification request in step S023 (step S023: Yes), the notification determining unit 212 executes "entry processing" (step S024). Details of the entry processing are provided below.

If it is determined that the notification request is not an entry notification request in step S023 (step S023: No), that is, if the notification request is determined to be an exit notification request, the notification determining unit 212 executes "exit processing" (step S025). Details of the exit processing are provided below.

As described above, the server 200 according to the present embodiment executes the entry processing or the exit processing based on the notification request, that is based on an entry notification request or an exit notification request, from the apparatus 100.

Entry Processing

The notification determining unit 212 in the server 200 according to the present embodiment executes the following entry processing.

Figure 14:
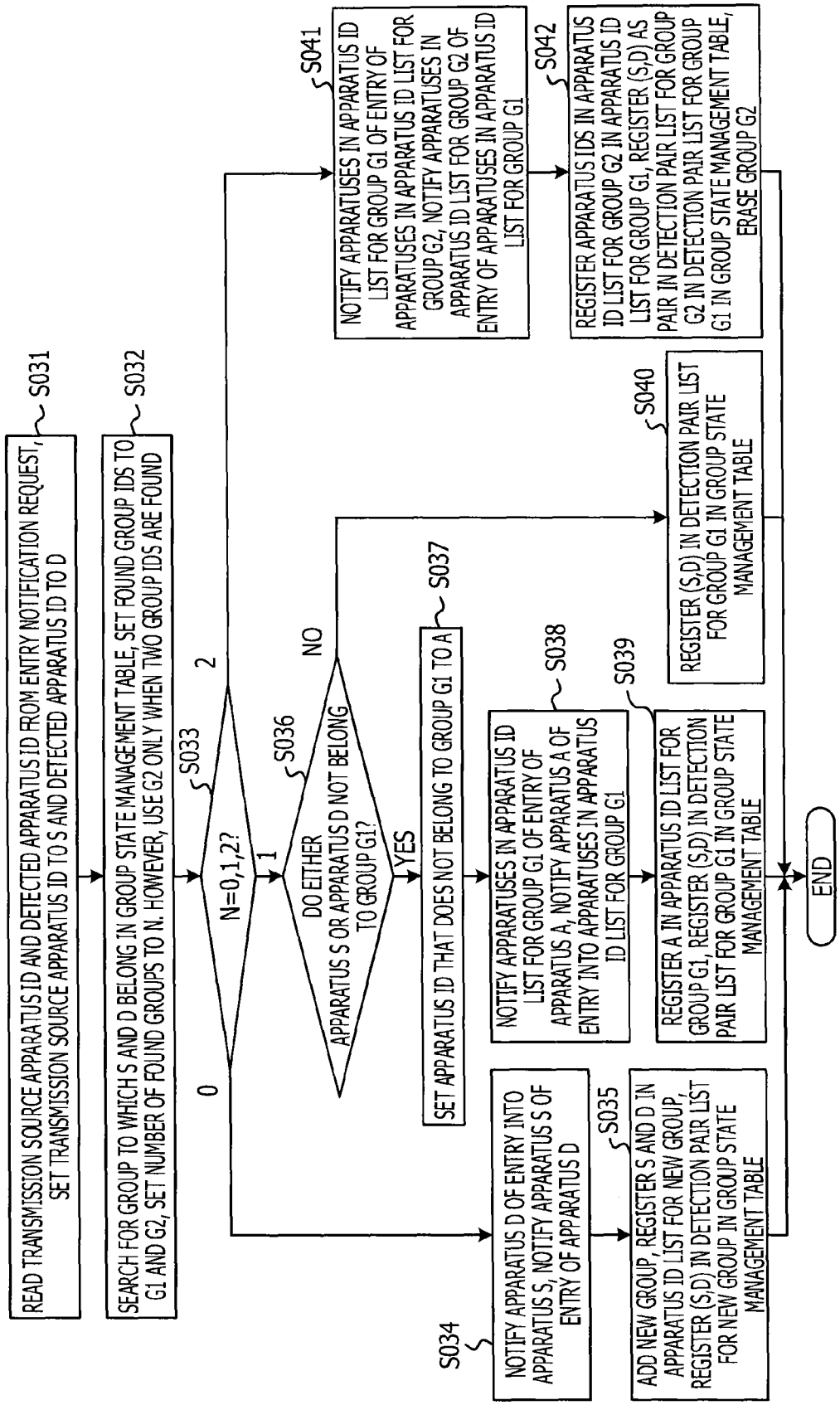
FIG. 14 is a flow chart of entry processing according to the first embodiment.

FIG. 14 is a flow chart of entry processing according to the first embodiment.

As illustrated in FIG. 14, the notification determining unit 212 reads the apparatus ID of the apparatus that is the transmission source of the notification request (hereinbelow, "transmission source apparatus ID") and the apparatus ID of the detected apparatus (hereinbelow, "detected apparatus ID") from the entry notification request, and sets the transmission source apparatus ID to "S" and the detected apparatus ID to "D" (step S031).

Next, the notification determining unit 212 searches for the group IDs to which "S" or "D" belong in the group state management table T, sets the found group IDs to "G1" and "G2", and sets the number of found groups to "N" (step S032). Note that "G2" is used only when two group IDs are found.

Next, the notification determining unit 212 determines whether "N" is "0", "1", or "2" (step S033).

If "N" is determined to be "0" in step S033 (step S033: "0"), that is if it is determined that no group ID is found to which "S" or "D" belong, the notification determining unit 212 notifies the apparatus "D" of the entry into the apparatus "S" and notifies the apparatus "S" of the entry of the apparatus "D" (step S034).

Next, the notification determining unit 212 adds a new group to the group state management table T, registers "S" and "D" in the apparatus ID list for the new group, and registers (S,D) in the detection pair list for the new group (step S035). A detailed example is described below (see detailed example 1).

If "N" is determined to be "1" in step S033 (step S033: "1"), that is if it is determined that one group ID is found to which "S" or "D" belong, the notification determining unit 212 determines which of the apparatus "S" or the apparatus "D" does not belong to the group "G1" (step S036).

If it is determined in step S036 that either the apparatus "S" or the apparatus "D" does not belong to the group "G1" (step S036: Yes), the notification determining unit 212 sets the apparatus ID of the apparatus that does not belong to the group "G1" to "A" (step S037).

Next, the notification determining unit 212 notifies apparatuses in the apparatus ID list for the group "G1" of the entry of the apparatus "A" and notifies the apparatus "A" of the entry into the apparatuses in the apparatus ID list for the group "G1" (step S038).

Next, the notification determining unit 212 registers "A" in the apparatus ID list for the group "G1" in the group state management table T, and registers (S,D) in the detection pair list for the group "G1" (step S039). A detailed example is described below (see detailed example 2).

If it is determined in step S036 that the apparatus "S" and the apparatus "D" both belong to the group "G1" (step S036: No), the notification determining unit 212 registers (S,D) in the detection pair list for the group "G1" in the group state management table T (step S040). At this time, the notification determining unit 212 does not notify the entry of the apparatus. A detailed example is described below (see detailed example 3).

If "N" is "2" in step S033 (step S033: "2"), that is if two group IDs to which "S" or "D" belong are found, the notification determining unit 212 notifies the apparatuses in the apparatus ID list for the group "G1" of the entry of the apparatuses in the apparatus ID list for a group "G2", and notifies the apparatuses in the apparatus ID list for the group "G2" of the entry of the apparatuses in the apparatus ID list for a group "G1" (step S041).

Next, the notification determining unit 212 registers the apparatus IDs in the apparatus ID list for the group "G2" in the apparatus ID list for the group "G1" in the group state management table T, registers (S,D) as the pair in the detection pair list for the group "G2" in the detection pair list for the group "G1", and furthermore erases the group "G2" (step S042).

Detailed Example 1 for Entry Processing

Figures 15A, 15B, 15C:
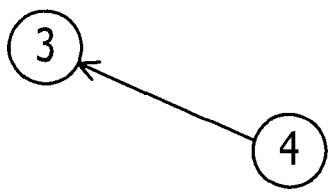
FIGS. 15A, 15B, and 15C are schematic views of a detailed example 1 of entry processing according to the first embodiment.

FIGS. 15A, 15B, and 15C are schematic views of a detailed example 1 of entry processing according to the first embodiment.

The detailed example 1 is an example in which an apparatus "4" approaches an apparatus "3" and a new group is generated.

As illustrated in FIG. 15A, when the apparatus "4" approaches the apparatus "3" and the entry into the apparatus "3" is detected, the server 200 receives the entry notification request of the apparatus "3" from the apparatus "4" and sets "S" to "4" and "D" to "3" (step S031).

As illustrated in FIG. 15B, the server 200 then determines that a group to which "3" or "4" belongs is not present in the group state management table T and then sets "N" to "0" (step S032).

The server 200 then notifies the apparatus "3" of the entry into the apparatus "4" and notifies the apparatus "4" of the entry of the apparatus "3" (step S034).

As illustrated in FIG. 15C, the server 200 then adds a new group "4" to the group state management table T and registers "3" and "4" in the apparatus ID list for the group "4" and registers (3,4) in the detection pair list for the group "4" (step S035).

Detailed Example 2 for Entry Processing

Figures 16A, 16B, 16C:
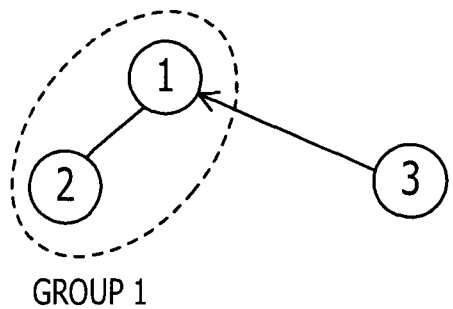
FIGS. 16A, 16B, and 16C are schematic views of a detailed example 2 of entry processing according to the first embodiment.

FIGS. 16A, 16B, and 16C are schematic views of a detailed example 2 of entry processing according to the first embodiment.

The detailed example 2 is an example in which the apparatus "3" approaches the apparatus "1" and the apparatus "3" is added to the group "1" to which the apparatus "1" belongs.

As illustrated in FIG. 16A, when the apparatus "3" approaches the apparatus "1" and the entry into the apparatus "1" is detected, the server 200 receives the entry notification request for the apparatus "1" from the apparatus "3" and sets "S" to "3" and "D" to "1" (step S031).

As illustrated in FIG. 16B, the server 200 then determines that the group "1" to which "1" or "3" belongs is present in the group state management table T, sets "G1" to "1", and then sets "N" to "1" (step S032).

As illustrated in FIG. 16B, since the apparatus "3" is not included in the apparatus ID list for the group "1" (step S036), the server 200 sets "A" to "3" (step S037).

The server 200 then notifies the apparatus "1" and the apparatus "2" of the entry of the apparatus "3" and notifies the apparatus "3" of the entry into the apparatus "1" and the apparatus "2" (step S038).

As illustrated in FIG. 16C, the server 200 then registers "3" in the apparatus ID list for the group "1" and registers (1,3) in the detection pair list for the group "1" in the group state management table T (step S039).

Detailed Example 3 for Entry Processing

FIGS. 17A, 17B, and 17C are schematic views of a detailed example 3 of entry processing according to the first embodiment.

The detailed example 3 is an example in which the apparatus "3" approaches the apparatus "2" but no change in the group is generated.

As illustrated in FIG. 17A, when the apparatus "3" approaches the apparatus "2" and the entry into the apparatus "2" is detected, the server 200 receives the entry notification request into the apparatus "2" from the apparatus "3" and sets "S" to "3" and sets "D" to "2" (step S031).

As illustrated in FIG. 17B, the server 200 then finds the group "1" to which "2" or "3" belongs in the group state management table T, sets "G1" to "1", and then sets "N" to "1" (step S032).

The server 200 then does not notify the entry of the apparatus since "2" and "3" belong to the group "1", and registers (2,3) in the detection pair list for the group "1" in the group state management table T as illustrated in FIG. 17C (step S040).

Detailed Example 4 for Entry Processing

FIGS. 18A, 18B, and 18C are schematic views of a detailed example 4 of entry processing according to the first embodiment.

The detailed example 4 is an example in which the apparatus "3" approaches the apparatus "2", and the group "1" to which the apparatus "2" belongs and a group "2" to which the apparatus "3" belongs become one group.

As illustrated in FIG. 18A, when the apparatus "3" approaches the apparatus "2" and the entry into the apparatus "2" is detected, the server 200 receives the entry notification request into the apparatus "2" from the apparatus "3" and sets "S" to "3" and sets "D" to "2" (step S031).

As illustrated in FIG. 18B, the server 200 then finds the group "1" and the group "2" to which "2" or "3" belong in the group state management table T and sets "G1" to "1", "G2" to "2", and "N" to "2" (step S032).

The server 200 then notifies the apparatus "1" and the apparatus "2" of the entry of the apparatus "3" and the apparatus "4" and notifies the apparatus "3" and the apparatus "4" of the entry into the apparatus "1" and the apparatus "2" (step S041).

As illustrated in FIG. 18C, the server 200 then registers "3" and "4" in the apparatus ID list for the group "G1" and registers (3,4) and (2,3) in the detection pair list for the group "G1" in the group state management table T, and erases the group "2" from the group state management table T (step S042).

Exit Processing

The notification determining unit 212 in the server 200 according to the present embodiment executes the following exit processing.

Figure 19:
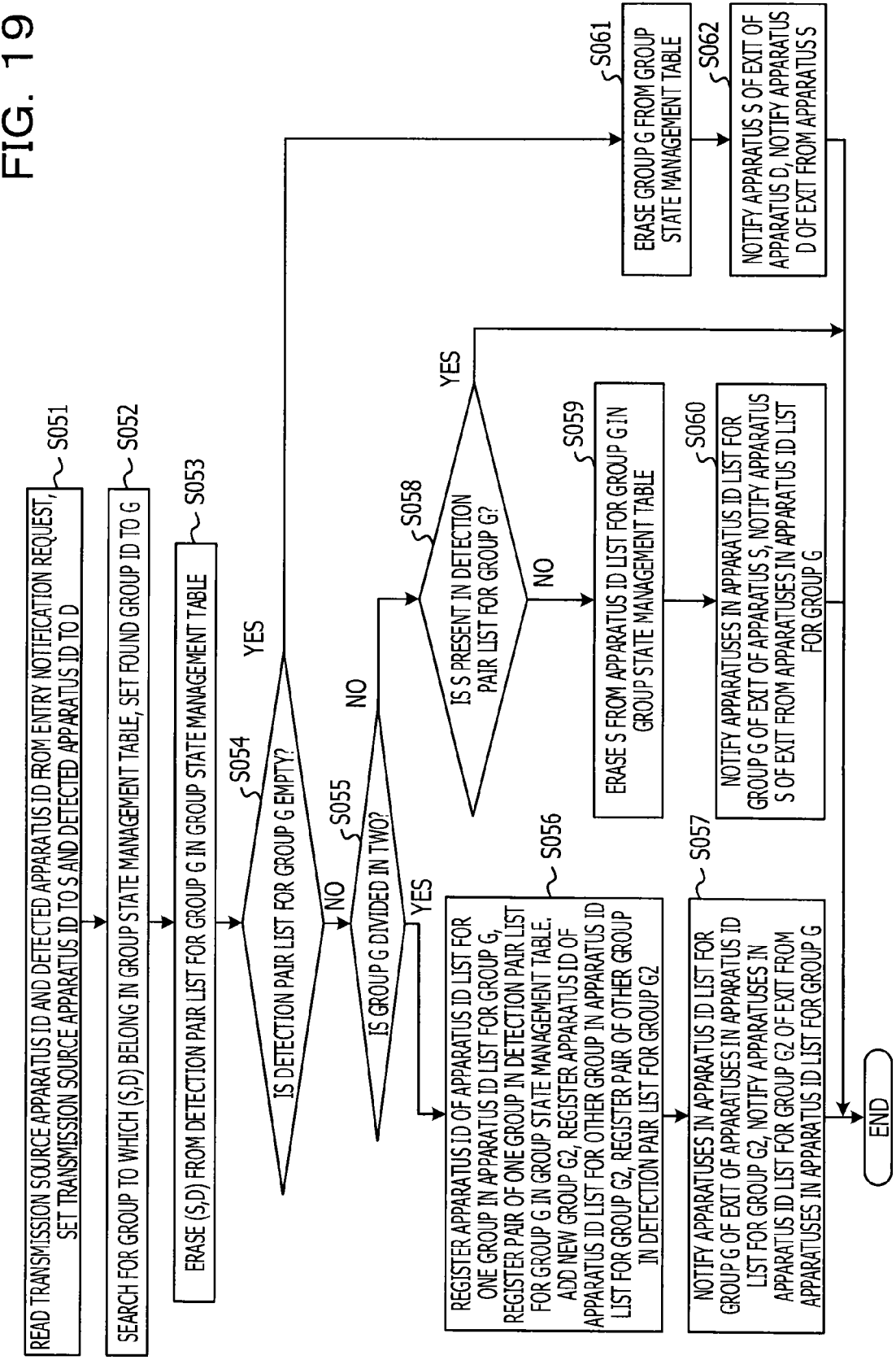
FIG. 19 is a flow chart of exit processing according to the first embodiment.

FIG. 19 is a flow chart of exit processing according to the first embodiment.

As illustrated in FIG. 19, the notification determining unit 212 reads the apparatus ID of the apparatus that is the transmission source of the notification request (hereinbelow, "transmission source apparatus ID") and the apparatus ID of the detected apparatus (hereinbelow, "detected apparatus ID") from the exit notification request, and sets the transmission source apparatus ID to "S" and the detected apparatus ID to "D" (step S051).

The notification determining unit 212 then searches for a group that includes (S,D) in the group state management table T and sets the found group ID to "G" (step S052).

Next, the notification determining unit 212 erases (S,D) from the detection pair list for the group "G" in the group state management table T (step S053).

Next, the notification determining unit 212 determines whether the detection pair list for the group "G" in the group state management table T is empty (step S054).

If it is determined in step S054 that the detection pair list for the group "G" is empty (step S054: Yes), the notification determining unit 212 erases the group "G" from the group state management table T (step S061).

The notification determining unit 212 then notifies the apparatus "S" of the exit of the apparatus "D" and notifies the apparatus "D" of the exit from the apparatus "S" (step S062). A detailed example is described below (see detailed example 5).

If it is determined in step S054 that the detection pair list of the group "G" is not empty (step S054: No), the notification determining unit 212 determines whether the group "G" has been divided in two (step S055).

If it is determined in step S055 that the group "G" has not been divided into two (step S055: No), the notification determining unit 212 determines whether "S" is present in the detection pair list for the group "G" (step S058).

If it is determined that "S" is not present in the detection pair list for the group "G" in step S058 (step S058: No), the notification determining unit 212 erases "S" from the apparatus ID list for the group "G" in the group state management table T (step S059).

The notification determining unit 212 then notifies the apparatuses in among apparatus IDs for the group "G" in the group state management table T of the exit of the apparatus "S" and notifies the apparatus "S" of the exit from the apparatuses among the apparatus ID list for the group "G" (step S060). A detailed example is described below (see detailed example 6).

If it is determined in step S058 that "S" is present in the detection pair list for the group "G" (step S058: Yes), the notification determining unit 212 ends the exit processing.

If it is determined in step S055 that the group "G" has been divided into two (step S055: Yes), the notification determining unit 212 registers the apparatus ID of the apparatus ID list for one of the groups in the apparatus ID list for the group "G", registers the pair in one of the groups in the detection pair list for the group "G" in the group state management table T, and furthermore adds a new group "G2", registers the apparatus ID that belongs to the other group in the apparatus ID list for the group "G2", and registers the pair of the other group in the detection pair list for the group "G2" (step S056).

The notification determining unit 212 then notifies the apparatuses in the apparatus ID list for the group "G" of the exit of the apparatuses in the apparatus ID list for the group "G2", and notifies the apparatuses in the apparatus ID list for the group "G2" of the exit from the apparatuses in the apparatus ID list for the group "G" (step S057).

Detailed Example 5 of Exit Processing

Figure 20A:
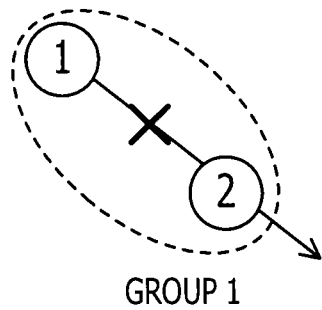
FIGS. 20A, 20B, and 20C are schematic views of a detailed example 5 of exit processing according to the first embodiment.
Figure 20B:
Figure 20C:

FIGS. 20A, 20B, and 20C are schematic views of a detailed example 5 of exit processing according to the first embodiment.

The detailed example 5 is an example in which the apparatus "2" moves away from the apparatus "1" and the group is erased.

As illustrated in FIG. 20A, when the apparatus "2" moves away from the apparatus "1" and the exit from the apparatus "1" is detected, the server 200 receives the exit notification request of the apparatus "1" from the apparatus "2" and sets "S" to "2" and "D" to "1" (step S051 in FIG. 19).

As illustrated in FIG. 20B, the server 200 then finds the group "1" that includes (1,2) in the group state management table T and sets "G" to "1" (step S052 in FIG. 19).

Next, the server 200 then erases (1,2) from the detection pair list for the group "G1" in the group state management table T (step S053 in FIG. 19).

The server 200 then determines that the detection pair list for the group "1" has become empty (step S054 in FIG. 19) and erases the group "1" from the group state management table T as illustrated in FIG. 20C (step S061 in FIG. 19).

The server 200 then notifies the apparatus "S" of the exit from the apparatus "D" and notifies the apparatus "D" of the exit of the apparatus "S" (step S062 in FIG. 19).

Detailed Example 6

FIGS. 21A, 21B, and 21C are schematic views of a detailed example 6 of exit processing according to the first embodiment.

The detailed example 6 is an example in which the apparatus "3" moves away from the apparatus "1" and the apparatus "3" leaves the group "1" to which the apparatus "3" had belonged up to that point.

As illustrated in FIG. 21A, when the apparatus "3" moves away from the apparatus "1" and the exit from the apparatus "1" is detected, the server 200 receives the exit notification request of the apparatus "1" from the apparatus "3" and sets "S" to "3" and "D" to "1" (step S051 in FIG. 19).

As illustrated in FIG. 21B, the server 200 then finds the group "1" that includes (1,3) in the group state management table T and sets "G" to "1" (step S052 in FIG. 19).

As illustrated in FIG. 21C, the server 200 then erases (1,3) from the detection pair list for the group "1" in the group state management table T (step S053 in FIG. 19).

The server 200 then determines that the detection pair list for the group "1" is not empty (step S054 in FIG. 19: No) and then determines that the group "1" was not divided into two (step S055 in FIG. 19: No), and furthermore determines that "3" is not present in the detection pair list for the group "1" in the group state management table T (step S058 in FIG. 19: No) and erases "3" from the apparatus ID list for the group "1" in the group state management table T (step S059 in FIG. 19: No).

The server 200 then notifies the apparatus "1" and the apparatus "2" of the exit of the apparatus "3" and notifies the apparatus "3" of the exit from the apparatus "1" and the apparatus "2" (step S060 in FIG. 19).

Detailed Example 7

FIGS. 22A, 22B, and 22C are schematic views of a detailed example 7 of exit processing according to the first embodiment.

The detailed example 7 is an example in which the apparatus "3" moves away from the apparatus "1" and the apparatus "3" leaves the group "1" to which the apparatus "3" had belonged up to that point.

As illustrated in FIG. 22A, when the apparatus "3" moves away from the apparatus "1" and the exit from the apparatus "1" is detected, the server 200 receives the exit notification request of the apparatus "1" from the apparatus "3" and sets "S" to "3" and "D" to "1" (step S051 in FIG. 19).

As illustrated in FIG. 22B, the server 200 then finds the group "1" that includes (1,3) in the group state management table T and sets "G" to "1" (step S052 in FIG. 19).

As illustrated in FIG. 22C, the server 200 then erases (1,3) from the detection pair list for the group "1" in the group state management table T (step S053 in FIG. 19).

The server 200 then determines that the detection pair list for the group "1" is not empty (step S054 in FIG. 19: No) and then determines that the group "1" has not been divided into two (step S055 in FIG. 19: No), and furthermore determines that "3" is present in the detection pair list for the group "1" in the group state management table T (step S058 in FIG. 19: Yes) and then ends the exit processing according to the present embodiment.

Detailed Example 8

Figures 23A, 23B, 23C:
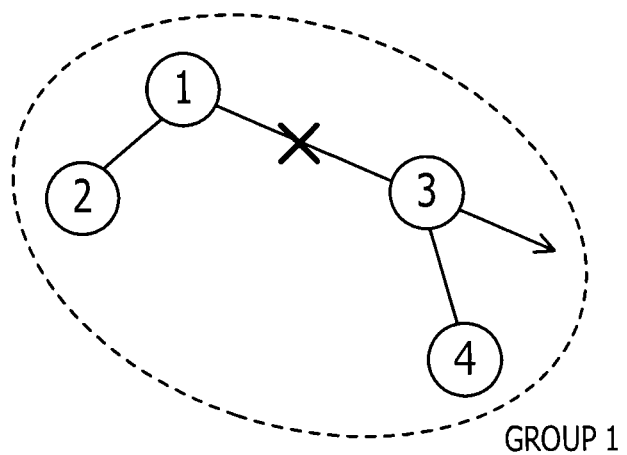
FIGS. 23A, 23B, and 23C are schematic views of a detailed example 8 of exit processing according to the first embodiment.

FIGS. 23A, 23B, and 23C are schematic views of a detailed example 8 of exit processing according to the first embodiment.

The detailed example 8 is an example in which the apparatus "3" moves away from the apparatus "1" and the group "1" to which the apparatus "3" had belonged up to that point is divided into two.

As illustrated in FIG. 23A, when the apparatus "3" moves away from the apparatus "1" and the exit from the apparatus "1" is detected, the server 200 receives the exit notification request of the apparatus "1" from the apparatus "3" and sets "S" to "3" and "D" to "1" (step S051 in FIG. 19).

As illustrated in FIG. 23B, the server 200 then finds the group "1" that includes (1,3) in the group state management table T and sets "G" to "1" (step S052 in FIG. 19).

Next, the server 200 erases (1,3) from the detection pair list for the group "G1" in the group state management table T (step S053 in FIG. 19).

The server 200 then determines that the detection pair list for the group "1" is not empty (step S054 in FIG. 19: No) and further determines that the group "1" has been divided into two (step S055 in FIG. 19: Yes), and as illustrated in FIG. 23C registers "1" and "2" in the apparatus ID list for the group "G", registers (1,2) in the detection pair list for the group "G", registers "3" and "4" in the apparatus ID list for the new group "G2", and registers (3,4) in the detection pair list for the new group "G2" in the group state management table T (step S056 in FIG. 19).

The server 200 then notifies the apparatus "1" and the apparatus "2" of the exit of the apparatus "3" and the apparatus "4" and notifies the apparatus "3" and the apparatus "4" of the exit from the apparatus "1" and the apparatus "2" (step S057 in FIG. 19).

Second Embodiment

An explanation of the second embodiment will be provided hereinbelow with reference to FIGS. 24 and 25. The configuration, functions, and operations that are the same as those of the first embodiment will be omitted from the following explanation.

Functional Blocks of Apparatus 100A

Figure 24:
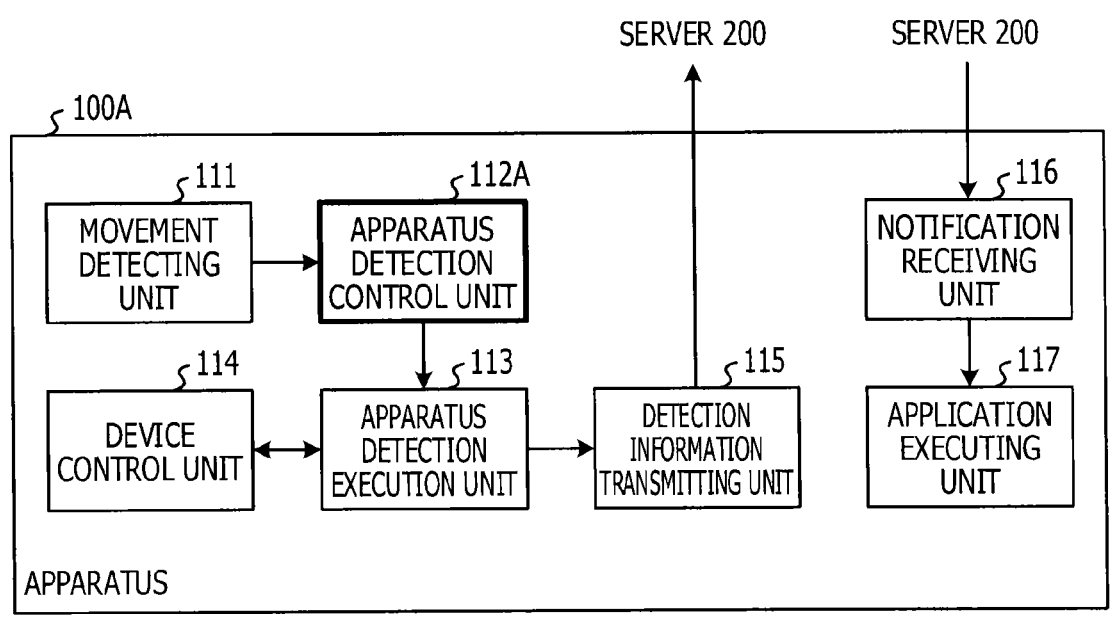
FIG. 24 is a schematic view of functional blocks of the apparatus according to a second embodiment.

FIG. 24 is a schematic view of functional blocks of an apparatus 100A according to the second embodiment.

As illustrated in FIG. 24, the apparatus 100A is provided with an apparatus detection control unit (scanning control unit) 112A in place of the apparatus detection control unit 112 of the apparatus 100 according to the first embodiment.

The apparatus detection control unit 112A is realized by the CPU 101 reading a control program into the main memory 102 and executing the control program read in the main memory 102.

The apparatus detection control unit 112A issues a scanning instruction to cause the wireless device 105 to execute scanning for a first time period (corresponding to the predetermined time period according to the first embodiment) after the movement state of the apparatus 100A changes from "stationary" to "movement". Moreover, the apparatus detection control unit 112A issues a scanning instruction to cause the wireless device 105 to execute scanning for a second time period after the movement state of the apparatus 100A changes from "movement" to "stationary". The second time period is longer than the first time period.

Scanning Control Processing

Figure 25:
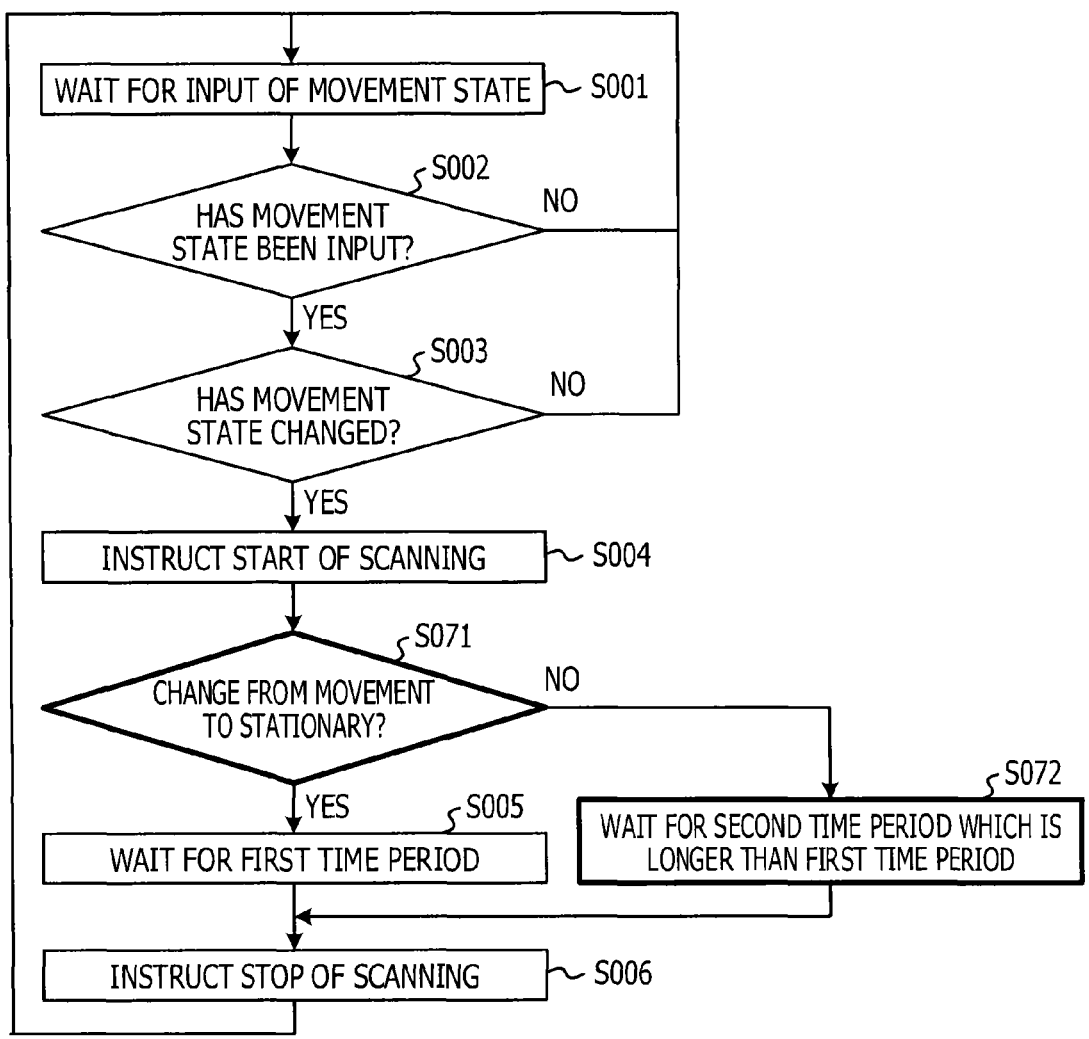
FIG. 25 is a flow chart of scanning control processing according to the second embodiment.

FIG. 25 is a flow chart of scanning control processing according to the second embodiment.

As illustrated in FIG. 25, the apparatus detection control unit 112A first issues an instruction to the apparatus detection execution unit 113 to start scanning (step S004) and then determines whether a change in the movement state of the apparatus 100A is from "movement" to "stationary" (step S071).

If it is determined in step S071 that the change in the movement state is from "movement" to "stationary" (step S071: Yes), the apparatus detection control unit 112A waits for the first time period (corresponding to the predetermined time period according to the first embodiment) after the change in the movement state in the same way as in the first embodiment (step S005) and then instructs the apparatus detection execution unit 113 to stop scanning (step S006).

However, if it is determined in step S071 that the change in the movement state is not from "movement" to "stationary" (step S071: No), that is when the change in the movement state is determined to be a change from "stationary" to "movement", the apparatus detection control unit 112A waits for the second time period which is longer than the first time period (step S072), and then instructs the apparatus detection execution unit 113 to stop scanning (step S006).

When considering the possibility that beacon signals from a plurality of apparatuses may collide so that wireless signals are not observed, a problem may arise when an exit is determined when a beacon signal is not observed one time and thus an apparatus for which accidentally no signal was received despite being nearby may be treated as an apparatus that exits. As a result, when the movement state changes from "stationary" to "movement" and an exit occurs, a determination may be made due to the fact that no beacon signal could be observed a plurality of times during the observation of the beacon signals for a longer period of time. Accordingly in the second embodiment, the scanning time period for a change in the movement state from "stationary" to "movement" when the apparatus 100 moves away from the apparatus that is the transmission source of the beacon signals, is longer than the scanning time period for a change in the movement state from "movement" to "stationary".

Moreover, when scanning is executed a plurality of times during a scanning time period, the time period from the start of scanning until the end may be increased. Moreover, conducting the scanning a plurality of times may be conducted as one continuous scan.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A terminal device configured to communicate with an information processing device, the terminal device comprising:
a memory; and
a processor coupled to the memory and configured to
execute scanning for a wireless signal at a first frequency for at least one of a first time period and a second time period, the first time period is a time period after the terminal device changes from a stationary state to a movement state, and the second time period is a time period after the terminal device changes from the movement state to the stationary state,
when the scanning at the first frequency is executed for the first time period, perform at least one of stopping the scanning and executing the scanning at a second frequency lower than the first frequency after the first time period has elapsed, and when the scanning at the first frequency is executed for the second time period, perform at least one of stopping the scanning and executing the scanning at the second frequency after the second time period has elapsed,
when another terminal device is detected during the scanning in at least one of the first time period and the second time period, transmitting, from the terminal device to the information processing device, first information identifying the terminal device and second information identifying the another terminal device, wherein
the first information identifying the terminal device is transmitted from the information processing device to the another terminal device.

2. The terminal device according to claim 1, wherein the processor is configured to
transmit first identification information which indicates an apparatus that is a transmission source of the wireless signal detected during the executing of the scanning, and second identification information which indicates the terminal device, to the information processing device.

3. The terminal device according to claim 1, wherein the processor is configured to
execute the scanning at the first frequency during the first time period and the second time period, and
wherein the first time period is longer than the second time period.

4. The terminal device according to claim 1, wherein the information processing device is a server.

5. The terminal device according to claim 2, wherein the transmitting of the first identification information and the second identification information to the information processing device is conducted by using wireless communication.

6. A scanning method using a first terminal device, a second terminal device and an information processing device, the method comprising:
executing, by the first terminal device, scanning for a wireless signal at a first frequency for at least one of a first time period and a second time period, the first time period is a time period after the first terminal device changes from a stationary state to a movement state, and the second time period is a time period after the first terminal device changes from the movement state to the stationary state, when the scanning at the first frequency is executed for the first time period, performing, by the first terminal device, at least one of stopping the scanning and executing the scanning at a second frequency lower than the first frequency after the first time period has elapsed, and when the scanning at the first frequency is executed for the second time period, performing, by the first terminal device, at least one of stopping the scanning and executing the scanning at the second frequency after the second time period has elapsed, when the second terminal device is detected in the scanning in at least one of the first time period and the second time period, transmitting, from the first terminal device to the information processing device, first information identifying the first terminal device and second information identifying the second terminal device, and transmitting, from the information processing device to the second terminal device, the first information specifying the first terminal device.

7. The scanning method according to claim 6, further comprising:

transmitting first identification information which indicates an apparatus that is a transmission source of the wireless signal detected during the executing of the scanning, and second identification information which indicates the terminal device, to the information processing device.

8. The scanning method according to claim 6, further comprising:

executing the scanning at the first frequency during the first time period and the second time period, wherein, the first time period is longer than the second time period.

9. The scanning method according to claim 6, wherein:
the information processing device is a server.

10. The scanning method according to claim 7, wherein:
the transmitting of the first identification information and the second identification information to the information processing device is conducted by using wireless communication.

11. An information processing system comprising:
an information processing device; and
a terminal device including a first memory and a first processor coupled to the first memory and configured to execute scanning for a wireless signal at a first frequency for at least one of a first time period and a second time period, the first time period is a time period after the terminal device changes from a stationary state to a movement state, and the second time period is a time period after the terminal device changes from the movement state to the stationary state, when the scanning at the first frequency is executed for the first time period, perform at least one of stopping the scanning and executing the scanning at a second frequency lower than the first frequency after the first time period has elapsed, and when the scanning at the first frequency is executed for the second time period, perform at least one of stopping the scanning and executing the scanning at the second frequency after the second time period has elapsed, when another terminal device is detected in the scanning in at least one of the first time period and the second time period, transmit first identification information identifying the another terminal device that is a transmission source of the wireless signal detected during the executing of the scanning, and second identification information identifying the terminal device, to the information processing device, and transmitting, by the information processing device, the second identification information to the another terminal device.

12. The information processing system according to claim 11, wherein the first processor is configured to
execute the scanning at the first frequency during the first time period and the second time period,
wherein, the first time period is longer than the second time period.

13. The information processing system according to claim 11, wherein
the information processing device is a server.

14. The information processing system according to claim 11, wherein
the transmitting of the first identification information and the second identification information to the information processing device is conducted by using wireless communication.

15. The information processing system according to claim 11, wherein the second processor is configured to
manage the apparatus and the terminal device as a first group.

16. The information processing system according to claim 15, wherein the second processor is configured to
when receives a third identification information that differs from the first identification information and the second identification information, add another terminal device corresponding to the third identification information into the first group.

17. The information processing system according to claim 16, wherein the second processor is configured to
when the another terminal device is included in a second group, add into the first group a third terminal device included in the second group.

* * * * *